United States Patent [19]

Shimada et al.

[11] Patent Number: 4,812,039

[45] Date of Patent: Mar. 14, 1989

[54] SCHLIEREN OPTICAL DEVICE

[75] Inventors: Yoshihiro Shimada; Tadafumi Fujihara; Chikara Nagano, all of Tokyo; Katsuo Tsukamoto, Sendai, all of Japan

[73] Assignee: Olympus Optical Co., Ltd., Tokyo, Japan

[21] Appl. No.: 108,934

[22] Filed: Oct. 16, 1987

[30] Foreign Application Priority Data

Oct. 16, 1986 [JP] Japan ................. 61-246189

[51] Int. Cl.$^4$ ............................. G01N 21/41
[52] U.S. Cl. ................................... 356/129
[58] Field of Search ................. 356/128, 129, 73, 344

[56] References Cited

PUBLICATIONS

Burner et al, "Schlieren with a Laser Diode Source", Optical Engineering, Sep./Oct. 1981, vol. 20, No. 5, pp. 801–802.

Primary Examiner—F. L. Evans
Attorney, Agent, or Firm—Cushman, Darby & Cushman

[57] ABSTRACT

A schlieren optical device using diode emitting monochromatic light as spot light source so as to have a compact and light-weight design, low calorific power, and low power consumption, and assure high reliability. In said optical device, imaging lens consists of a pair of lens groups arranged with an airspace reserved therebetween, knife edge consists of a light-shielding coating arranged on the surface of one of said lens groups and the other lens group is displaceable along the optical axis. Said optical device comprises a schlieren optical system and an optical system of a transmission type of microscope having optical axes perpendicularly intersecting with each other at the position of a sample, or a pair of schlieren optical systems and an optical system of a transmission type of microscope having optical axes perpendicularly intersecting with one another.

11 Claims, 3 Drawing Sheets

SCHLIEREN OPTICAL DEVICE

BACKGROUND OF THE INVENTION (a) Field of the Invention

The present invention relates to a schlieren optical device.

(b) Description of the Prior Art

When physical or chemical ununiform states in transparent gases, liquids and solids cause variations of refractive indices, a light passing therethrough is refracted and the ununiform states are observable as bright and dark shadows by use of a schlieren optical device.

The conventional schlieren optical device comprises, as shown in FIG. 1 for example, a pinhole 4 using as a spot light source 3 a light emitted from a light source 1 and focused by a condenser lens 2, a front (on the side of the light source) schlieren lens 5 for making the light emitted from the spot light source 3 into parallel rays, a rear (on the side of image) schlieren lens 7 for converging the parallel rays having passed through a sample 6, a knife edge 8 arranged at the rear focal point of the rear schlieren lens 7, an imaging lens 9 for forming an image of the sample, and a photographic means 10 consisting of a photographic film, a screen, etc. placed at the imaging position of the imaging lens 9. Used as the light source 1 is a tungsten lamp or halogen lamp, whereas a mechanical knife-shaped member is employed as the knife edge 8. The imaging lens adopts a single-group composition.

For experiments within a limited instrumentation space, for example, artificial earth satellite, a compact design and light weight are desired to reduce the cost for mounting the experimental device in the artificial earth satellite, low power consumption is demanded since a heavy-duty power source cannot be mounted in the artificial earth satellite, and high reliability is demanded so as not to allow experimental failure. Further, low calorific power is required since no convection is produced and cooling effect is low in the aerospace.

However, when the above-mentioned conventional schlieren optical device is to be used for observing a sample containing a portion having a large refractive index and great influence on optical path length such as the solution for growing crystal, it is very difficult to design a compact light-weight device for the reason described below. A first requisite for the compact design is to shorten the optical path length l as measured from the sample 6 to the photographing means 10 (FIG. 1). In the above-mentioned conventional example of the schlieren optical device wherein spherical aberration is corrected by the imaging lens 9 having the single-group composition, the above-mentioned optical path length ( must inevitably be long for correcting spherical aberration. Further, the white light source such as a tungsten lamp or halogen lamp used as the light source 1 in the conventional schlieren optical device produces remarkable chromatic aberration and makes it further difficult to design a compact and light-weight schlieren optical device. Furthermore, the conventional schlieren optical device using a tungsten lamp or halogen lamp as the light source 1 has a high calorific power and cannot be used in an enclosed space or vacuum condition such as aerospace free from convection.

Moreover, a tungsten lamp or halogen lamp has high power consumption and low reliability. In addition, the conventional schlieren optical device uses a mechanical knife-shaped member as the knife edge 8 and requires a mechanical retaining structure for retaining the knife edge. Therefore, the knife edge 8 may be mispositioned by vibration and/or high gravity produced by acceleration at the stage of launching a space ship and cannot assure high reliability for experiments in a space ship.

SUMMARY OF THE INVENTION

In view of the above-mentioned problems, a general object of the present invention is to provide a schlieren optical device having little aberrations, a compact design, light weight, low calorific power, low power consumption and high reliability.

According to the present invention, this object can be accomplished by composing the light source of a solid-state element emitting a monochromatic light.

The schlieren optical device according to the present invention produces little chromatic aberration in the optical system thereof, thereby making it possible to shorten the optical path length as measured from a sample to the image plane and design the device compact and light-weight as a whole. Further, since the solid-state light emitting element has low calorific power, low power consumption and high reliability, the schlieren optical device has advantages of low calorific power, energy-saving characteristic and high reliability.

In a preferred formation of the schlieren optical device according to the present invention, the imaging lens is composed of two lens groups. This formation makes it possible to correct spherical aberration favorably, shorten the optical path length as measured from a sample to the image plane, and design the optical device more compact and lighter in weight.

In another preferred formation of the schlieren optical device according to the present invention, a knife edge is provided by coating the surface of the imaging lens with a light-shielding material. This formation facilitates to realize a compact and light-weight design, and enables to obtain excellent resistance to vibration, resistance to acceleration and high reliability of the optical device.

This and other objects as well as the features and advantages of the present invention will be apparent from the following detailed description of the preferred embodiments when taken in conjunction with the accompanying drawings.

DESCRIPTION OF THE PREFERRED EMBODIMENTS

Now, the present invention will be described more detailedly with reference to the embodiments illustrated in the accompanying drawings.

Figure 1:
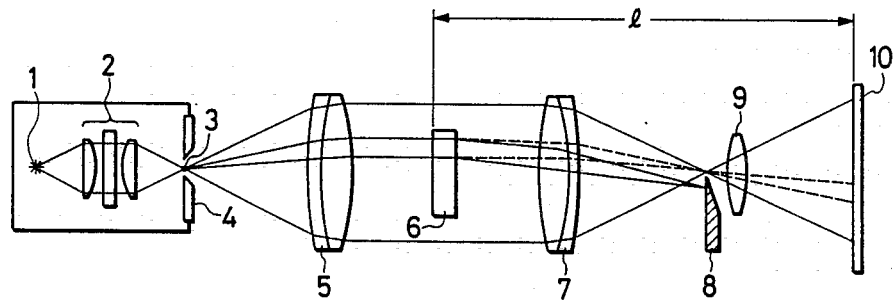
FIG. 1 is a sectional view illustrating the composition of an example of the conventional schlieren optical devices.
Figure 2:
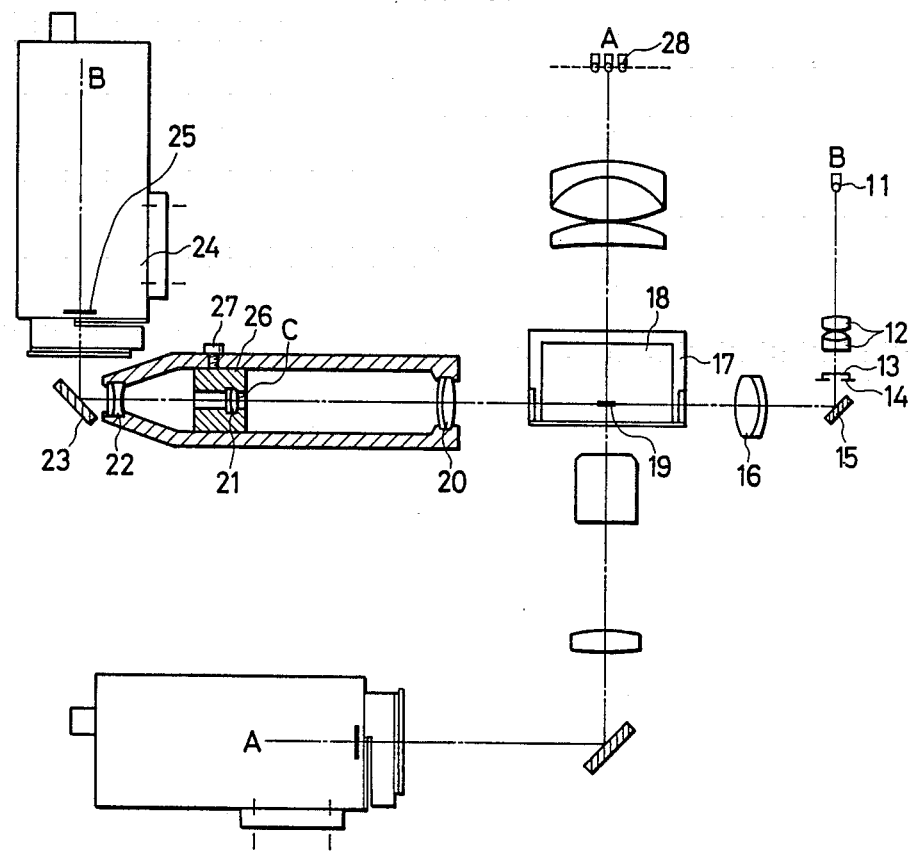
FIG. 2 is a sectional view illustrating the fundamental composition of an embodiment of the schlieren optical device according to the present invention.
Figure 3:
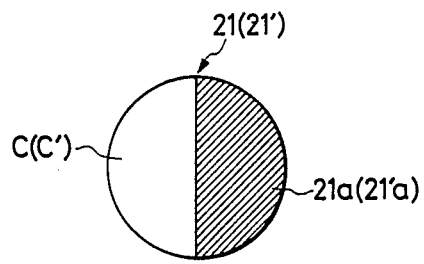
FIG. 3 is a front elevation of the knife edge used in the embodiment shown in FIG. 1.

FIG. 2 shows an optical device assembled in an enclosed container for observing growing process of a crystal in a solution: said optical device consisting of an optical system of a transmission type of microscope for observing surface of a crystal (the optical system A—A in FIG. 2) and a schlieren optical system (B—B in FIG. 2) for observing concentration distribution (optically variation of refractive index) around the crystal as Embodiment 1 of the present invention. The schlieren optical system will be described detailedly below. Used as a spot light source 11 is a light emitting diode having monochromatic property and the light emitted from the spot light source 11 is focused by a condenser lens 12 to form an image of the light source at the position of the front focal point of a front schlieren lens 16. Arranged on the imaging plane are a diffusing plate 13 for cancelling ununiformity of the light source image and a pinhole 14 for cutting off excessive light of the light source image. The rays emitted from the light source image are reflected by a mirror 15, made parallel by a front (on the side of the light source) schlieren lens 16, and irradiate a solution 18 and a crystal 19 contained in a crystal growth container 17. The reference numeral 20 represents a rear (on the side of image) schlieren lens which detects concentration distribution as variation of refractive index, and relays it to imaging lenses 21 and 22. The imaging lenses 21 and 22 project the image by way of a mirror 23 to a photographing surface 25 of a CCD camera 24. Further, the surface (the surface C in FIG. 2) of the imaging lens 21 is coated, as shown in FIG. 3 with a semi-circular light-shielding material 21a to shield half the rays emitted from the light source 11 and functions as a knife edge. The light-shielding coating 21a on the imaging lens 21 can be rotated by turning the lens frame 26 of the lens 21 and fixed at an optical rotational position by using a fixing means 27 such as a screw. Therefore, it is possible to set the schlieren optical system so as to obtain a desired schlieren effect by turning the lens frame 26.

Function of the above-described schlieren optical device will be explained below.

Since the schlieren optical device according to the present invention uses a light emitting diode having monochromatic property as the light source 11 as described above, the optical system produces little chromatic aberration, thereby making it possible to shorten the optical path length as measured from the solution 18 to the photographing plane 24 of the CCD camera 24, and design the optical device compact and light in weight. Further, since the light emitting diode itself has lower calorific power, higher energy-saving property and higher reliability than those of the tungsten lamp or halogen lamp, the schlieren optical device as a whole has low calorific power, high energy-saving property and high reliability. Furthermore, since the imaging lens has the two-group composition, aberrations can be corrected while shortening the optical path length as measured from a sample to the photographing plane 25 of the CCD camera 24, and accordingly the schlieren optical device can be designed compact and light in weight even when the sample contains the solution 18 having a high refractive index and giving a great influence on the optical path length. Furthermore, since the knife edge is formed by coating the surface of the imaging lens 21 with the light-shielding material 21a, a mechanical retaining structure is unnecessary, and accordingly the schlieren optical device can easily be designed compact and light in weight, and is excellent in resistance to vibration and acceleration, thereby having high reliability.

The Embodiment 2 is equivalent to the Embodiment 1 wherein the light source 28 of the optical system of the transmission type of microscope for observing the crystal surface (the optical system A—A in FIG. 2) and the light source 11 of the schlieren optical system (the optical system B—B in FIG. 2) for observing concentration distribution of the solution around the crystal are composed of diodes emitting lights of wavelengths different from each other, and has an advantage to permit different types of observations without adverse influence on the other optical system.

Figure 4:
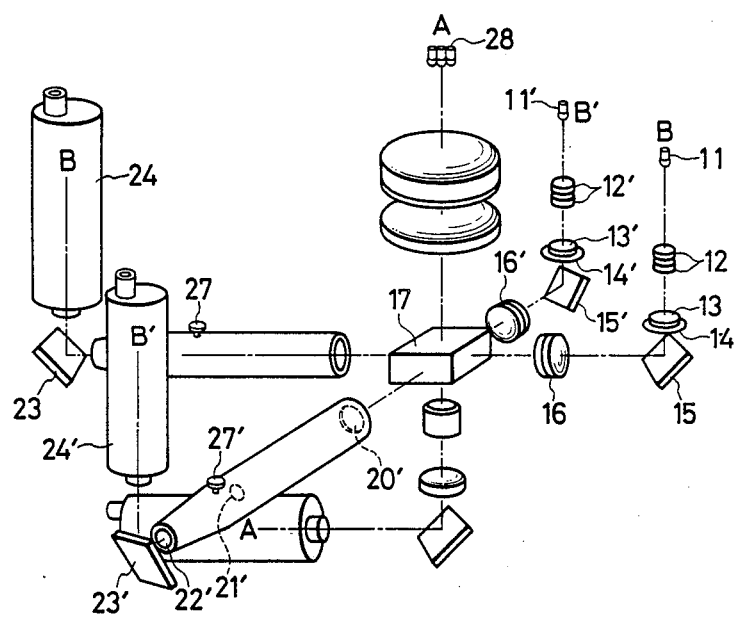
FIG. 4 is a schematic perspective view of another embodiment of the schlieren optical device according to the present invention.

FIG. 4 illustrates the Embodiment 2 of the present invention wherein a schlieren optical system B'—B' is arranged also in the direction perpendicular to the paper surface in the schlieren optical device shown in FIG. 2. Since the schlieren optical system B'—B' has the same composition as that of the optical system B—B, the component members thereof are represented by the reference numerals used in FIG. 2 with dashes, and detailed descriptions of the Embodiment 3 will be omitted. This Embodiment permits observing concentration distribution of the solution 18 in two directions and has an advantages to enable three-dimensional observation of concentration distribution. Also in this Embodiment, it is desirable for simultaneous observations to use diodes emitting lights of wavelengths different from one another.

Figure 5:
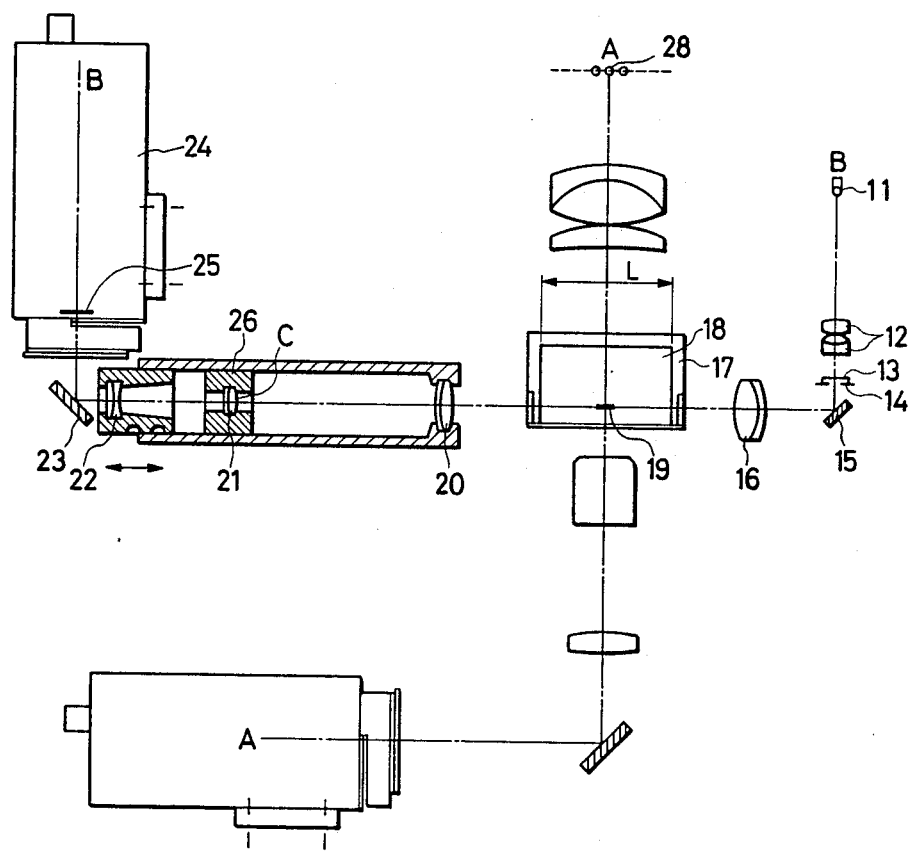
FIG. 5 is a sectional view of a third embodiment of the schlieren optical device according to the present invention.

FIG. 5 shows the Embodiment 3 of the present invention wherein a group of imaging lens 22 out of the two groups of the imaging lens can be displaced along the optical path as indicated by arrows and fixed at an optical position by a known means such as a click in the schlieren optical system for observing concentration distribution of the solution around the crystal. The Embodiment 3 has an advantage to permit correction of aberrations by displacing the imaging lens 22 along the optical path when refractive index of the solution 18 or thickness L of the solution 18 is changed.

What is claimed is:

1. A schlieren optical device comprising a spot light source, a first schlieren lens for making the rays emitted from said light source into parallel rays, a second schlieren lens for converging said parallel rays after having passed through a sample, a knife edge arranged at the position of the rear focal point of said second schlieren lens and an imaging lens for forming an image of said sample, wherein said spot light source emits monochromatic light and said imaging lens consists of a first lens group arranged at the position of the rear focal point of said second schlieren lens and a second lens group arranged with an airspace after said first lens group.

2. A schlieren optical device according to claim 1 wherein said second lens group can be displaced along the optical axis.

3. A schlieren optical device according to claim 1 wherein said knife edge is composed of a light-shielding coating formed on the surface of said first lens group.

4. A schlieren optical device according to claim 3 wherein said first lens group is rotatable around the optical axis.

5. A schlieren optical device according to claim 1 further comprising an optical system of a transmission type of microscope having an optical axis intersecting, at the position of a sample, with the optical axis of the schlieren optical system comprising said first schlieren lens and said second schlieren lens.

6. A schlieren optical device according to claim 5 wherein wavelength of the light emitted from said spot light source is different from the wavelength of the light emitted from a light emitting element used as a light source for said optical system of the transmission type of microscope.

7. A schlieren optical device equipped with a first schlieren optical system comprising a first spot light source consisting of a solid-state element emitting a monochromatic light, a first schlieren lens for making the light emitted from said first light source into parallel rays, a second schlieren lens for converging the parallel rays from said first spot light source after having passed through a sample, a first knife edge arranged at the position of the rear focal point of said second schlieren lens and a first imaging lens for forming an image of said sample; a second schlieren optical system comprising a second spot light source consisting of a solid-state element emitting a monochromatic light, a third schlieren lens for making the light emitted from said second spot light source into parallel rays, a fourth schlieren lens for converging the parallel rays from said second spot light source after having passed through said sample, a second knife edge arranged at the position of the rear focal point of said fourth schlieren lens and a second imaging lens for forming an image of said sample, and having an optical axis perpendicularly intersecting with the optical axis of said first schlieren optical system at the position of said sample; and an optical system of a transmission type of microscope having an optical axis perpendicularly intersecting with the optical axis of said first schlieren optical system and the optical axis of said second schlieren optical system at the position of said sample.

8. A schlieren optical device according to claim 7 wherein said first imaging lens consists of a first lens group arranged at the position of the rear focal point of said second schlieren lens and a second lens group arranged with an airspace after said first lens group, and said second imaging lens consists of a third lens group arranged at the position of the rear focal point of said fourth schlieren lens and a fourth lens group arranged with an airspace after said third lens group.

9. A schlieren optical device according to claim 8 wherein said second lens group and said fourth lens group are displaceable respectively along the optical axes.

10. A schlieren optical device according to claim 8 wherein said first knife edge consists of a light-shielding coating arranged on the surface of said first lens group and said second knife edge consists of a light-shielding coating arranged on the surface of said third lens group.

11. A schlieren optical device according to claim 10 wherein said first lens group and said third lens group are rotatable around the optical axes respectively.

* * * * *